(12) United States Patent
Suresh et al.

(10) Patent No.: US 10,530,588 B2
(45) Date of Patent: Jan. 7, 2020

(54) MULTI-STAGE NON-LINEARLY CASCADED PHYSICALLY UNCLONABLE FUNCTION CIRCUIT

(71) Applicant: Intel Corporation, Santa Clara, CA (US)

(72) Inventors: Vikram B. Suresh, Portland, OR (US); Sanu K. Mathew, Hillsboro, OR (US); Sudhir K. Satpathy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 222 days.

(21) Appl. No.: 15/382,362

(22) Filed: Dec. 16, 2016

(65) Prior Publication Data

US 2018/0176025 A1 Jun. 21, 2018

(51) Int. Cl.
*H04L 9/32* (2006.01)

(52) U.S. Cl.
CPC .................................. *H04L 9/3278* (2013.01)

(58) Field of Classification Search
CPC ............................ H04L 9/3278; H04L 9/0618
See application file for complete search history.

(56) References Cited

U.S. PATENT DOCUMENTS

| 8,683,210 | B2* | 3/2014 | Devadas | H04L 9/3278 380/44 |
| 8,782,396 | B2* | 7/2014 | Ziola | G06F 21/31 713/155 |
| 8,938,069 | B2* | 1/2015 | Orshansky | H04L 9/3278 380/28 |
| 9,088,278 | B2* | 7/2015 | Pfeiffer | H03K 19/003 |
| 9,722,805 | B2* | 8/2017 | Suzuki | H04L 9/3278 |
| 2014/0327469 | A1* | 11/2014 | Pfeiffer | H03K 19/003 326/8 |

OTHER PUBLICATIONS

G.E.Sus and S. Devadas, "Physical unclonable functions for device authentication and secret key generation", at Design Automation Conference (DAC), 2007.
U. Ruhrmair, et. al, "PUF Modeling Attacks on Simulated and Silicon Data", in IEEE Transactions on Information Forensics and Security, 2013.

* cited by examiner

*Primary Examiner* — Carl G Colin
*Assistant Examiner* — Vance M Little
(74) *Attorney, Agent, or Firm* — Green, Howard & Mughal LLP (57) ABSTRACT

An apparatus is provided which comprises: a first stage of physically unclonable function (PUF) circuits to receive an n-bit challenge, wherein the first stage of PUF circuits comprise a subset of 'n' PUF cells each of which is to generate an output bit; and a first stage of cipher blocks to receive the output bits from the subset of 'n' PUF cells, wherein the first stage of cipher blocks is to generate a plurality of bits.

20 Claims, 5 Drawing Sheets

MULTI-STAGE NON-LINEARLY CASCADED PHYSICALLY UNCLONABLE FUNCTION CIRCUIT

BACKGROUND

Ubiquitous Internet-of-Things (IoT) platforms require cryptographic authentication protocols to secure communications among devices or between a device and cloud. These ultra-low power platforms require unconventional authentication mechanisms to enable secure communication. However, the tight area and energy constraints of IoT platforms prevent the use of traditional cryptographic protocols with a stored key, which are in any case vulnerable to probing and side channel attacks such as photon emission attacks. Physically unclonable function circuits (PUFs) provide a solution to enable secure communication. However, current PUFs have been shown to be vulnerable to machine learning attacks due to the linearity of response bits to an input challenge.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Strong Physically Unclonable Function (PUF) circuits with a large challenge-response space are becoming vital ingredients of secure authentication for IoT edge devices. These devices have to validate their identity back to another device (e.g., cloud) to attest the authenticity of data streams emanating from the edge devices. To protect against man-in-the-middle attacks, a challenge-response (CR) pair used for authentication is discarded after a single-use. To provide sufficient number of CR pairs for the lifetime of the edge device, in the context of machine-learning attacks, it is important to maintain a sufficiently large CR space with non-linear relationship between challenges and responses, while maintaining a low area and energy footprint to make them viable for IoT edge devices. PUF cells harness the entropy contained in random process variation to generate unique device-specific identifications (IDs). A "strong" PUF has a uniformly distributed response space that increases exponentially with the n-bit challenge.

Various embodiments describe a non-linearly cascaded, multi-stage machine-learning attack resistant CR PUF circuit for secure authentication of devices such as IoT edge devices. However, the embodiments are not limited to IoT edge devices, and can be used for any device capable of communicating with another device. The CR PUF circuit of various embodiments is an all-digital PUF circuit. Here, the term "all-digital" refers to an implementation that uses substantially digital circuits or logic gates to perform Boolean logic function when activing on logic signals. The CR PUF circuit of some embodiments creates unique unpredictable responses by harnessing the entropy of random process variations in a re-configurable cross-coupled inverter using (i) Multi-stage cascaded PUF cells, and/or (ii) increased machine learning attack resistance using non-linear cascading using non-linear mapping functions (e.g., Advanced Encryption Standard (AES) S-boxes, Skein cryptographic hash function, etc.). The all-digital PUF circuit of various embodiments provides a non-linear relationship between challenge-response pairs, an attribute that is important to ensuring machine-learning resistance in high-volume IoT device authentication.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, etc., may be used without departing from the scope of the disclosure.

Figure 1:
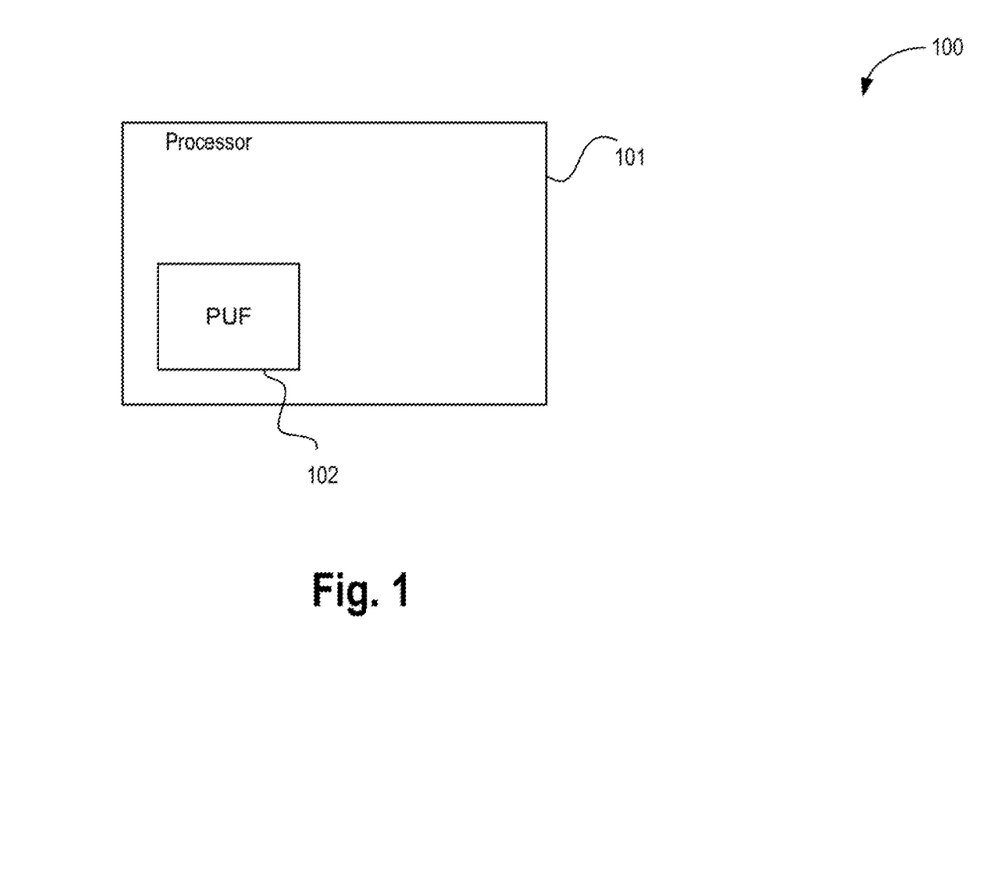
FIG. 1 illustrates an apparatus comprising a processor or an integrated circuit (IC) having a multi-stage non-linearly cascaded Physically Unclonable Function (PUF) circuit, according to some embodiments of the disclosure.

FIG. 1 illustrates apparatus 100 comprising processor 101 or an integrated circuit (IC) having a multi-stage non-linearly cascaded Physically Unclonable Function (PUF) array 102, according to some embodiments of the disclosure. In some embodiments, processor 101 is an integrated circuit such as a general purpose central processing unit (CPU), an application specific integrated circuit (ASIC), digital signal processor (DSP), router chip (e.g., a networking processor), baseband processor, IoT edge device, or any other processor that would benefit from having a PUF circuit.

In some embodiments, PUF array 102 comprises one or more re-configurable cross-coupled inverters that are either pre-charged or pre-discharged to a high gain state. The PUF array 102 may include several cascaded stages of PUF circuits or cells. In some embodiments, PUF array 102 receives an n-bit challenge and generates a response output. In some embodiments, the 'n' challenge bits are used to select contending pull-down or pull-up legs of the inverters along with a pair of delay paths to generate the pre-charge/discharge clock, where 'n' is an integer. Depending on the relative mismatches in the contending pull-down/pull-up devices of the cross-coupled inverters and the differential delay mismatches in the clock delay element, the output resolves to a stable response bit of '1' or '0'.

In some embodiments, PUF array 102 comprises a subset of 'n' (e.g., "n/2") parallel PUF cells. For example, PUF array 102 comprises 32 parallel PUF cells wherein each cell receives a 4-bit challenge so that the PUF array 102 consumes a 128-bit challenge. In some embodiments, the response of these 32 PUF cells are cascaded as challenge to the next stage of 16 PUF cells, thereby masking the intermediate response bits from an attacker. In some embodiments, non-linear mapping (e.g., Advanced Encryption Standard (AES) S-boxes, Whirlpool hash function S-box, skein cryptographic has function, etc.) is used to further increase machine learning resistance.

Figure 2:
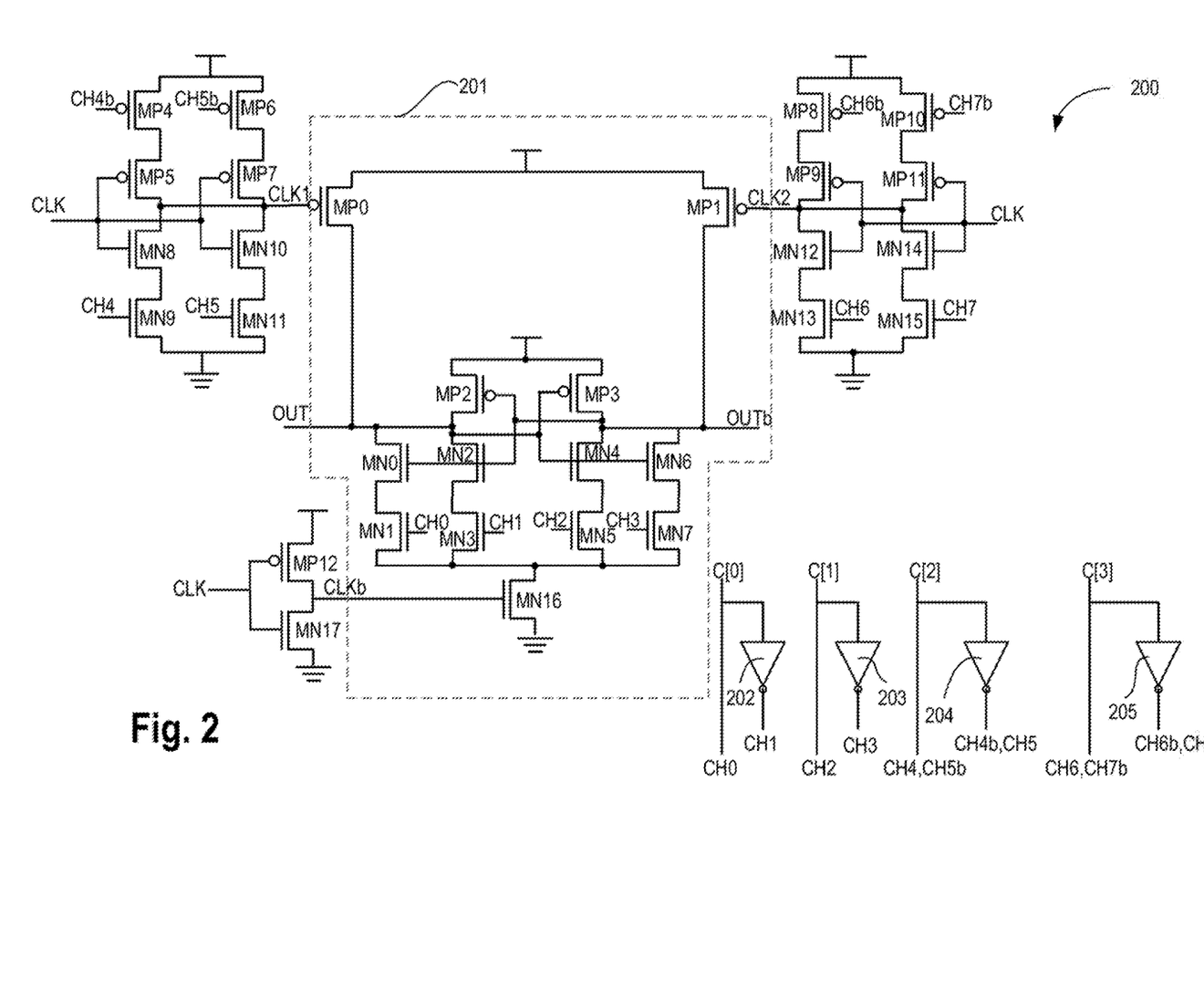
FIG. 2 illustrates a PUF circuit cell with re-configurable pull-down path that is used to form the multi-stage non-linearly cascaded PUF circuit, according to some embodiments of the disclosure.

FIG. 2 illustrates PUF circuit cell 200 with re-configurable pull-down path that is used to form the multi-stage non-linearly cascaded PUF circuit, according to some embodiments of the disclosure. It is pointed out that those elements of FIG. 2 having the same reference numbers (or names) as the elements of any other figure can operate or function in any manner similar to that described, but are not limited to such. PUF circuit cell 200 may be used as a building block for making PUF array 102, in accordance with some embodiments.

In some embodiments, PUF circuit cell 200 comprises a cross-coupled inverter 201. In some embodiments, cross-coupled inverter 201 comprises n-type transistors MN0, MN1, MN2, MN3, MN4, MN5, MN6, MN7, and MN16, and p-type transistors MP0, MP1, MP2, and MP3 coupled together as shown. The drain terminal of MP2 is the node OUT while the drain terminal of MP3 is the node OUTb (which is a complement of OUT). Here, labels for nodes and signals are interchangeably used. For example, OUT may refer to node OUT or signal OUT depending on the context of the sentence. The gate terminal of MN1 is controlled by CH0. The gate terminal of MN3 is controlled by CH1. The gate terminal of MN5 is controlled by CH2. The gate terminal of MN7 is controlled by CH3. The gate terminal of MN16 is controlled by clock signal CLKb (which is an inverter of clock signal CLK). The gate terminal of transistor MP0 is controlled by CLK1. The gate terminal of transistor MP1 is controlled by CLK2.

In some embodiments, cross-coupled inverter 201 is pre-charged or discharged on both nodes (e.g., OUT and OUTb) to resolve to a stable state depending on the relative pull-down or pull-up strengths of the inverter devices, respectively. In some embodiments, cross-coupled inverter 201 is re-configurable cross-coupled inverter with multiple pull-down legs (e.g., transistors MN1, MN3, MN5, and MN7) which can be configured using a set of one-hot challenge bits. While the embodiment of FIG. 2 illustrates configurable pull-down legs, cross-coupled inverter 201 can also have configurable pull-up legs or a combination of configurable pull-up and pull-down legs. In some embodiments, each set of challenge bits compares outputs from a different pair of inverter resulting in a different resolution state depending on the relative mismatch between the devices of the inverter.

In this example, re-configurable cross-coupled inverter 201 comprises two pull-down paths in each inverter. A 2-bit challenge C[1:0] can be decoded to generate one-hot signals CH0/CH1 and CH2/CH3 to select one of the pull-down legs of each inverter. Similarly, challenge bits C[3:2] can be decoded to generate one-hot signals CH4/CH5 and CH6/CH7 to select the clock delay cell on the pre-charge path.

Here, challenge bit C[0] is same as CH0, and CH1 is an inverted version of CH0 via inverter 202. Likewise, challenge bit C[1] is same as CH2, and CH3 is an inverted version of CH2 via inverter 203. Challenge bit C[2] is same as CH4 and CH5*b*, and CH4*b* (which is same as CH5) is an inverted version of CH4 via inverter 204. Challenge bit C[3] is same as CH6 and CH7*b*, and CH6*b* (which is same as CH7) is an inverted version of CH6 via inverter 205.

When the clock signal CLK is low, the nodes OUT and OUTb are pre-charged to power supply Vcc. In this case, the pull-down path is cutoff using the footer n-type device MN16. When the clock signal CLK goes low, CLK1 and CLK2 become high and as such the pre-charge transistors MP0 and MP1 are released (e.g., transistors MP0 and MP1 are turned off) and the cross-coupled inverters are allowed to resolve to a stable state of OUT=1 or OUT=0. The node OUTb resolves to the complimentary state of node OUT. The resolution state of nodes OUT and OUTb depends mainly on the relative pull-down strength of the cross-coupled inverter and the relative delay of the clock inverters. Here, CLKb is generated by an inverter comprising p-type transistor MP12 and n-type transistor MN17, which receive CLK as input.

Pre-charge control signals CLK1 and CLK2 are generated by two sets of delay circuits, in accordance with some embodiments. The first set of delay circuit provides CLK1 for p-type transistor MP0. In some embodiments, the first set of delay circuit comprises p-type devices MP4, MP5, MP6, and MP7, and n-type devices MN8, MN9, MN10, and MN11 coupled together as shown. In some embodiments, transistor MN9 is controlled by CH4. In some embodiments, transistor MN11 is controlled by CH5. In some embodiments, transistor MP4 is controlled by CH4b, and transistor MP6 is controlled by CH5b. In some embodiments, the second set of delay circuit provides CLK2 for p-type transistor MP1. In some embodiments, the second set of delay circuit comprises p-type devices MP8, MP9, MP10, and MP11 coupled together as shown, and n-type devices MN12, MN13, MN14, and MN15 coupled together as shown. In some embodiments, transistor MN13 is controlled by CH6. In some embodiments, transistor MN15 is controlled by CH7. In some embodiments, transistor MP8 is controlled by CH6b, and transistor MP10 is controlled by CH7b.

The one-hot signals CH0 and CH1 select either transistors MN0/MN1 or MN2/MN3, respectively, in one of the inverters. The one-hot signals CH2 and CH3 select either transistors MN4/MN5 or MN6/MN7, respectively, in the other inverter. The within-die process variation in these devices result in different resolution state across each challenge and across different chips for the same challenge. These variations can relate to different signal propagation delays through the devices within a die.

Similarly, the one-hot signals CH4/CH5 and CH6/CH7 determine the pre-charge delay times of the signals CLK1 and CLK2. As a result, a 4-bit challenge C[3:0] can generate 16 unique responses depending on the n-type devices and the clock inverters enabled. The circuit of FIG. 2 can be extended to multiple n-type transistors and clock inverter stages to increase the challenge response space, in accordance with some embodiments. In some embodiments, a pre-charge/evaluate PUF cell can be replaced with a discharge/evaluate cell to achieve the same functionality.

Figure 3:
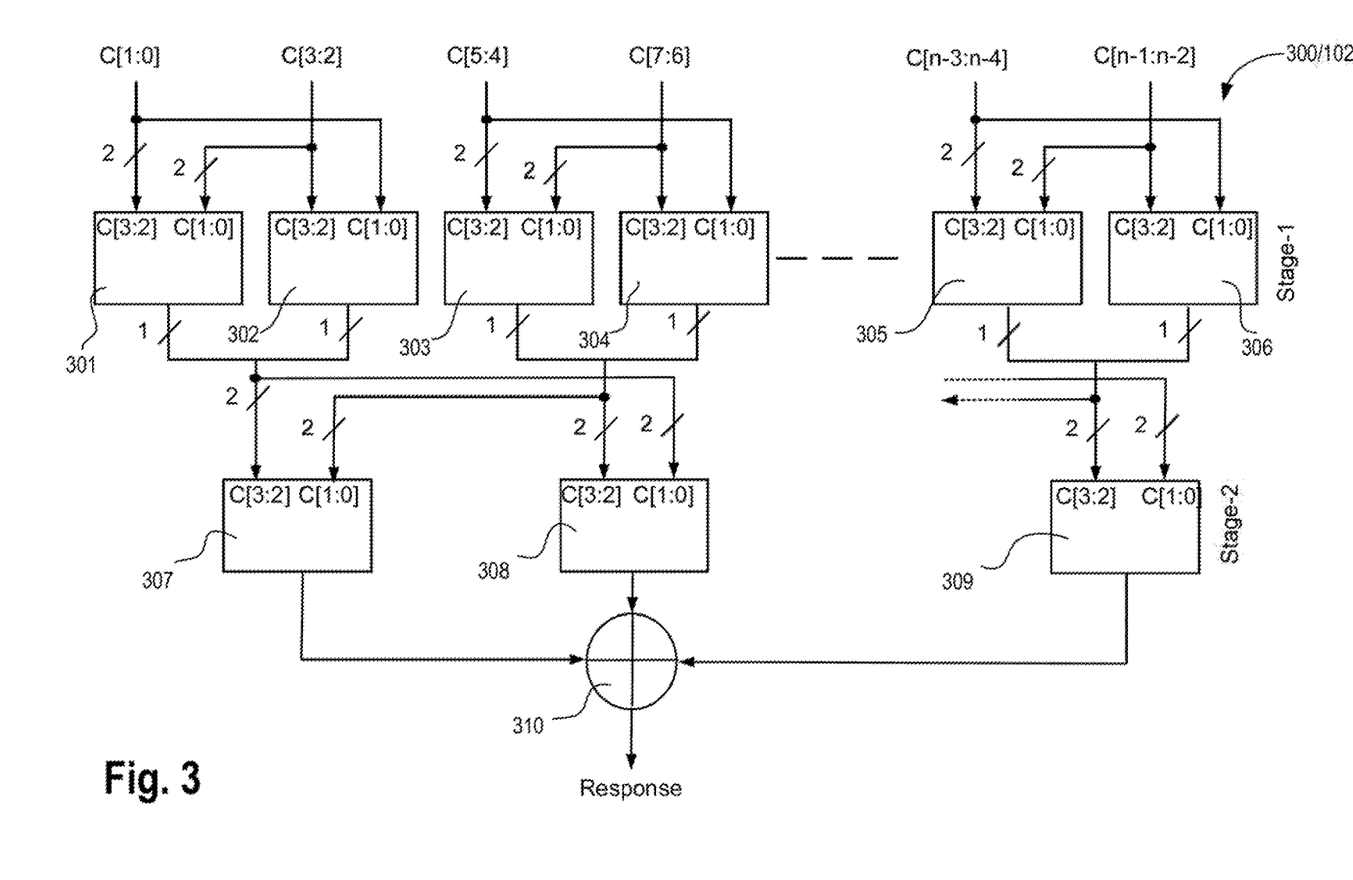
FIG. 3 illustrates a multi-stage non-linearly cascaded PUF circuit for a large challenge-response space, according to some embodiments of the disclosure.

FIG. 3 illustrates a multi-stage non-linearly cascaded PUF circuit 300 for a large challenge-response space, according to some embodiments of the disclosure. It is pointed out that those elements of FIG. 3 having the same reference numbers (or names) as the elements of any other figure can operate or function in any manner similar to that described, but are not limited to such.

In some embodiments, to increase the challenge response space, for an n-bit challenge, a subset of 'n' (e.g., "n/2") parallel PUF cells are used with alternate 2-bits of the challenge configuring the n-type device paths and clock inverters, respectively. For instance, challenge bits C[1:0] are used to configure the clock inverters in PUF Cell 301 (cell 0) and n-type device paths in PUF Cell 302 (cell 1). As a result, a single bit change in the challenge affects at least two PUF cells in the first stage. Other PUF cells of the first stage (Stage-1) are PUF cell 303 (cell 3), PUF cell 304 (cell 4) . . . PUF cell 305 ((n/2)−2), and PUF cell 306 ((n/2)−1).

In some embodiments, the response of the first stage is used as the challenge for a second stage (Stage-2) of a further subset of 'n' (e.g., "n/4") PUF cells. In this example, the second stage includes PUF cell 307 (cell 0), PUF cell 308 (cell 1) . . . and PUF cell 309 ((n/4)−1). The response of the second stage can be used as the challenge to a third stage (not shown) of PUF cells or compared by logic 310 (e.g., XOR-ed) to generate a single bit PUF Response. The number of stages of PUF cells and the order of challenge bits can be configured based on the PUF requirements. For example, more than two stages of PUF cells can be cascaded and then the output of the PUF cells from the last stage are compared (e.g., XOR-ed) to generate the Response.

Figure 4:
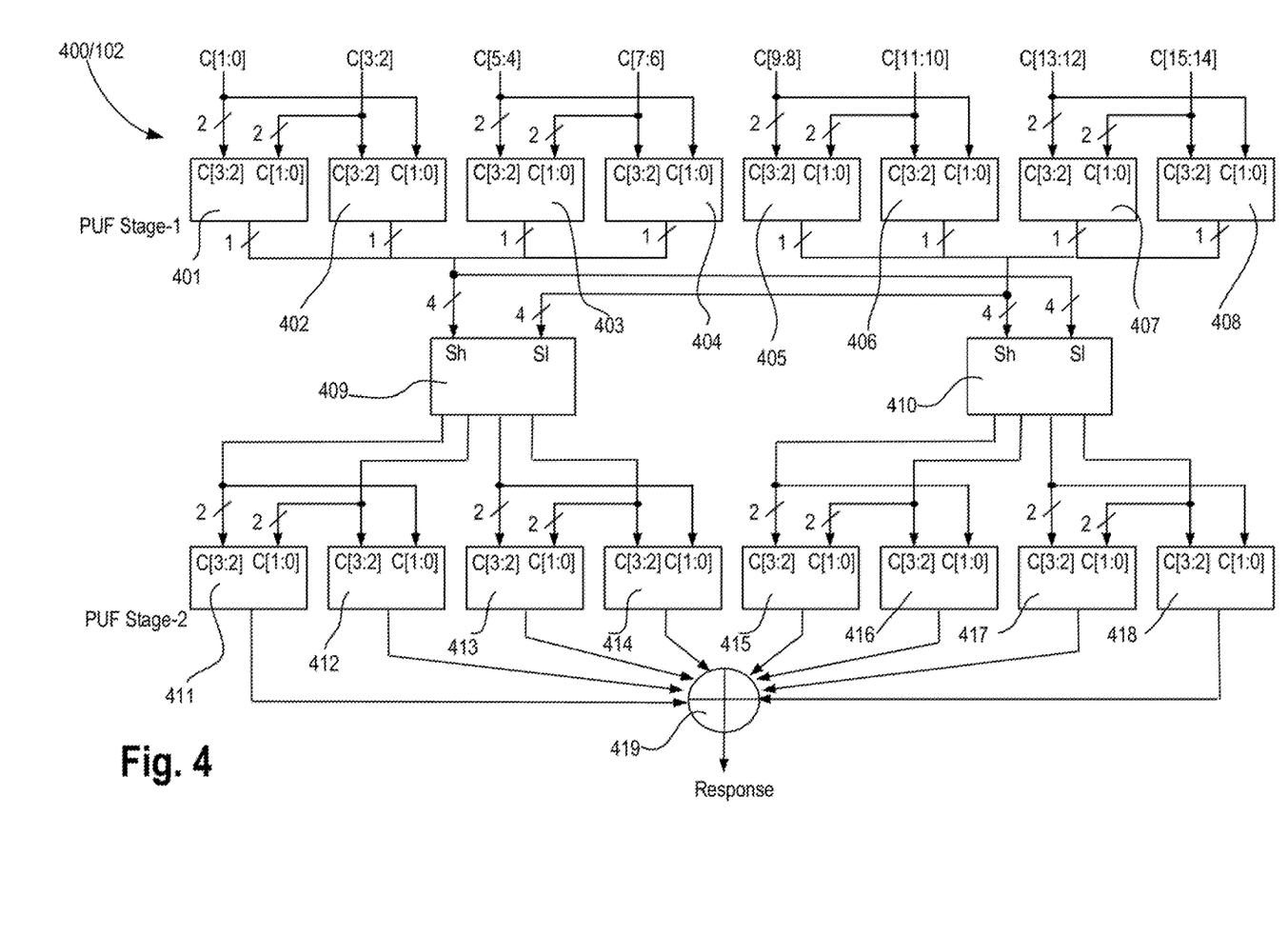
FIG. 4 illustrates a multi-stage non-linearly cascaded PUF circuit with increased machine learning resistance using non-linear mapping, according to some embodiments of the disclosure.

FIG. 4 illustrates a multi-stage non-linearly cascaded PUF circuit 400 with increased machine learning resistance using non-linear mapping, according to some embodiments of the disclosure. It is pointed out that those elements of FIG. 4 having the same reference numbers (or names) as the elements of any other figure can operate or function in any manner similar to that described, but are not limited to such.

To increase the non-linearity of the PUF challenge-response relationship, a non-linear mapping function can be added to the intermediate response bits before applying them as challenge to the next state of PUF cells. PUF circuit 400 shows an embodiment of a 2-stage PUF circuit with AES S-box (square of any numbers) based non-linear mapping. Here, Stage-1 comprises PUF cell 401 (cell 0), PUF cell 402 (cell 1), PUF cell 403 (cell 2), PUF cell 404 (cell 3), PUF cell 405 (cell 4), PUF cell 406 (cell 5), PUF cell 407 (cell 6), and PUF cell 408 (cell 7). In this example, PUF cells 401 and 402 receive challenge bits C[1:0] and C[3:2], PUF cells 402 and 403 receive challenge bits C[5:4] and C[7:6], PUF cells 404 and 405 receive challenge bits C[9:8] and C[11:10], and PUF cells 406 and 407 receive challenge bits C[13:12] and C[15:14].

In some embodiments, the response of PUF Stage-1 is passed through the non-linear mapping function before applying as challenge to the next stage. This increases the non-linearity between the final response bit and the input challenge, increasing resistance to machine learning attacks. In this example, the non-linear mapping function is provided by encryption block 409 and encryption block 410. In some embodiments, the non-linear mapping by encryption block 409 and encryption block 410 is AES S-box. The encryption blocks 409 and 410 are also referred to as mapping functions. However, the embodiments are not limited to AES S-box for use in encryption block 409 and encryption block 410. A person skilled in the art would appreciate that S-box is part of an encryption algorithm but may not be an encryption box by itself.

The amendments are not limited to AES. For example, other encryptions based on other crypto specifications may be used. For instance, Skein hash function, El-Gamal encryption, Whirlpool hash function S-box, RSA encryption, Schonorr signature, PFP (pretty good privacy) encryption, etc. may be used for encryption block 409 and encryption block 410. In some embodiments, encryption block 409 and encryption block 410 have the same encryption function. In some embodiments, encryption block 409 and encryption block 410 have different encryption functions. For example, encryption block 409 applies AES S-box while encryption block 410 applies Skein hash function.

In the embodiments of FIG. 4, a single bit change in the challenge now affects 8 PUF cells in Stage-2 of PUF cells, thereby increasing the complexity of PUF modelling. These 8 PUF cells in stage-2 are PUF cell 411 (cell 0), PUF cell 412 (cell 1), PUF cell 413 (cell 2), PUF cell 414 (cell 3), PUF cell 415 (cell 4), PUF cell 416 (cell 5), PUF cell 417 (cell 6), and PUF cell 418 (cell 7). The outputs from the second stage of PUF cells are received by compare logic 419 (e.g., a logic that performs XOR function). The output of compare logic 419 is the Response from the 16-bit challenge.

PUF circuit 400 harnesses non-linearity in device mismatch to generate unique response bit for a given challenge, in accordance with some embodiments. In some embodiments, the challenge space is increased by using parallel PUF cells and cascading the responses to feed as challenge to subsequent PUF stages. In some embodiments, the non-linear behavior is further increased by introducing further encryption blocks (e.g., AES Sboxes) after the second stage.

Unlike tradition delay based strong PUFs, the response does not have a linear relationship with the challenge. A 1-bit change in the challenge results in the selection of a new pair of pull-down/pull-up path or the clock inverters, in accordance with some embodiments, creating a non-linear impact on the response bits generated. This, along with the cascading and non-linear mapping provides tolerance to machine learning attacks using algorithms such as Linear Support Vector Machine (SVM).

While the multi-stage non-linearly cascaded PUF circuits of FIG. 3 and FIG. 4 are described with reference to PUF circuit cell 200 of FIG. 2, the embodiments are not limited to PUF circuit cell 200 of FIG. 2. For example, any type of PUF circuit cell can be used for forming multi-stage non-linearly cascaded PUF circuits of FIG. 3 and FIG. 4.

Figure 5:
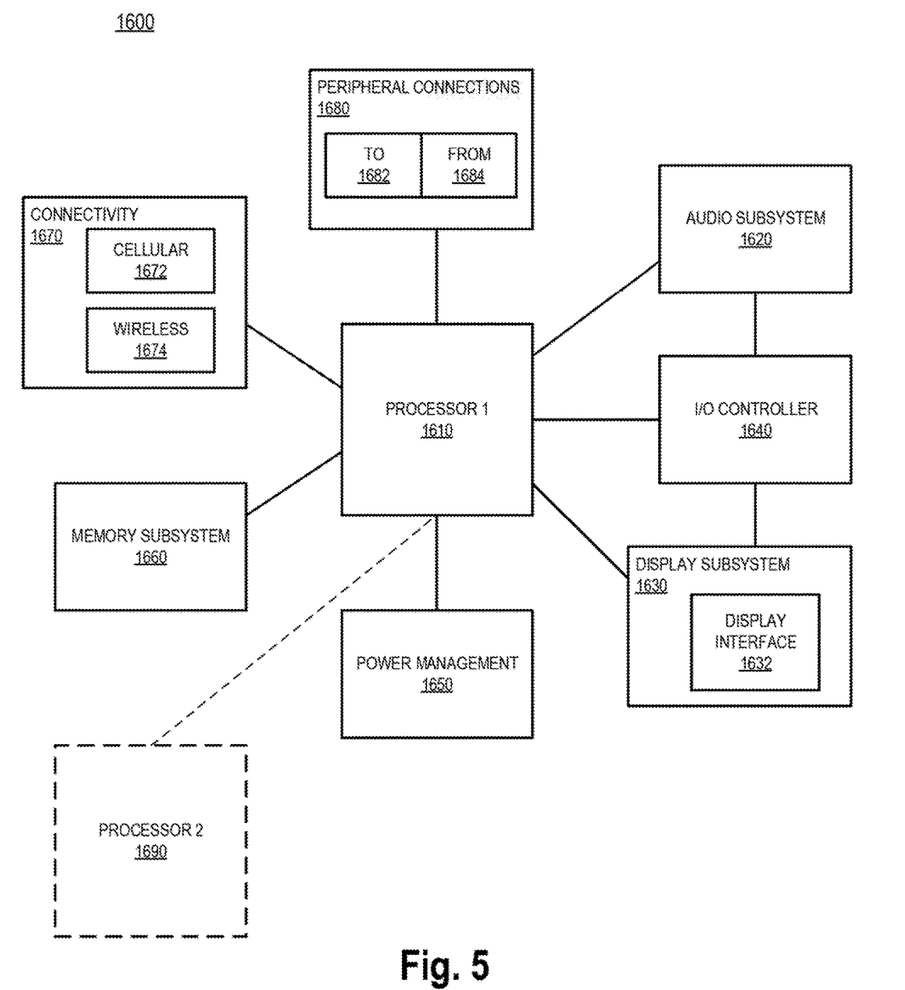
FIG. 5 illustrates a smart device or a computer system or a System-on-Chip (SoC) with one or more multi-stage non-linearly cascaded PUF circuits, according to some embodiments.

FIG. 5 illustrates a smart device or a computer system or a System-on-Chip (SoC) 1600 with one or more multi-stage non-linearly cascaded PUF circuits, according to some embodiments. It is pointed out that those elements of FIG. 5 having the same reference numbers (or names) as the elements of any other figure can operate or function in any manner similar to that described, but are not limited to such.

FIG. 5 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with one or more multi-stage non-linearly cascaded PUF circuits, according to some embodiments discussed. Other blocks of the computing device 1600 may also include one or more multi-stage non-linearly cascaded PUF circuits, according to some embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. In some embodiments, audio subsystem 1620 includes apparatus and/or machine executable instructions to avoid self-hearing, according to some embodiments. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 is an apparatus which comprises: a first stage of physically unclonable function (PUF) circuits to receive an n-bit challenge, wherein the first stage of PUF circuits comprise a subset of 'n' PUF cells each of which is to generate an output bit; a second stage of PUF circuits to receive the output bits from the subset of n PUF cells, wherein the second stage of PUF circuits comprise a further subset of the subset of 'n' PUF cells, wherein each PUF cell of the further subset is to generate an output bit; and a compare logic to compare the output bits of the further subset of the subset of 'n' PUF cells, and to generate a response bit according to the comparison, wherein 'n' is an integer.

Example 2 includes features of example 1 wherein the PUF cells of the first and second stages comprise cross-coupled inverters with multiple pull-down and pull-up legs.

Example 3 includes features of example 2 wherein the compare logic comprises an exclusive-OR gate.

Example 4 includes features of example 3 wherein the n-bit challenge is used to generate an internal 1-hot n-bit challenge.

Example 5 includes features of any one of examples 1 through 4 wherein the subset of 'n' PUF cells is n/2 PUF cells, and wherein the further subset of the subset of 'n' PUF cells is n/4 PUF cells.

Example 6 illustrates an apparatus which comprises: a first physically unclonable function (PUF) circuit to receive a first pair of bits and a second pair of bits; a second PUF circuit to receive the first pair of bits and the second pair of bits; a third PUF circuit to receive a third pair of bits and a fourth pair of bits; a fourth PUF circuit to receive the third pair of bits and the fourth pair of bits; a fifth PUF circuit to receive a first pair of output bits comprising a first output bit from the first PUF, and a second output bit from the second PUF, wherein the fifth PUF circuit is to receive a second pair of output bits comprising a first output bit from the third PUF and a second output bit from the fourth PUF.

Example 7 includes features of example 6 which comprises a sixth PUF circuit to receive the first and second pairs of output bits.

Example 8 includes features of example 7 which comprises a compare logic to receive outputs from the fifth and sixth PUF circuits, and to generate an output.

Example 9 includes features of example 8 wherein the compare logic comprises an exclusive-OR gate.

Example 10 includes features of example 7 wherein at least one of the first, second, third, fourth, fifth, and sixth PUF circuits comprises cross-coupled inverters with multiple pull-down and pull-up legs.

Example 11 includes features of example 6 wherein the first, second, third, and fourth pair of bits are a set of challenge bits for use in a challenge-response function.

Example 12 is a system which comprises: a memory; a processor coupled to the memory, wherein the processor comprises an apparatus according to examples 1 through 5; a wireless interface for allowing the processor to communicate with another device.

Example 13 is a system which comprises: a memory; a processor coupled to the memory, wherein the processor comprises an apparatus according to examples 6 through 11; a wireless interface for allowing the processor to communicate with another device.

Example 14 illustrates an apparatus which comprises: a first stage of physically unclonable function (PUF) circuits to receive an n-bit challenge, wherein the first stage of PUF circuits comprise a subset of 'n' PUF cells each of which is to generate an output bit; and a first stage of cipher blocks to receive the output bits from the subset of 'n' PUF cells, wherein the first stage of cipher blocks is to generate a plurality of bits.

Example 15 includes features of example 14 and comprises a second stage of PUF circuits to receive the plurality of bits from the first stage of cipher blocks, wherein the second stage of PUF circuits comprise a subset of 'n' PUF cells each of which is to generate an output bit.

Example 16 includes features of example 15 and comprises a compare logic to receive the output bits from the subset of n PUF cells of the second stage of PUF circuits, wherein the compare logic is to generate a response output for the n-bit challenge.

Example 17 includes features of example 16 wherein the PUF cells of the first and second stages comprise cross-coupled inverters with multiple pull-down and pull-up legs.

Example 18 includes features of example 17 wherein the compare logic comprises an exclusive-OR gate.

Example 19 includes features of example 15 wherein the n-bit challenge is used to generate an internal 1-hot n-bit challenge.

Example 20 includes features of example 15 wherein the first stage of cipher blocks comprises one of: AES S-box, Skein hash function, Whirlpool hash function S-box, El-Gamal encryption, RSA encryption, Schonorr signature, or PFP (pretty good privacy) encryption.

Example 21 illustrates a method which comprises: receiving an n-bit challenge; applying a first physically unclonable function (PUF) to the n-bit challenge; generating first output bits in response to the application of the first PUF; receiving the first output bits and applying a second PUF to the first output bits; generating second output bits in response to the application of the second PUF; and applying a logic function to the second output bits to generate a response to the n-bit challenge.

Example 22 includes features of example 21 wherein the n-bit challenge is used to generate an internal 1-hot n-bit challenge.

Example 23 illustrates a method which comprises: receiving an n-bit challenge; applying a first physically unclonable function (PUF) to the n-bit challenge; generating first output bits in response to the application of the first PUF; receiving the first output bits and applying a second PUF to the first output bits; applying a cypher function to the first output bits to generate second output bits; receiving second output bits and applying a second PUF to them; generating third output bits in response to the application of the second PUF; and applying a logic function to the third output bits to generate a response to the n-bit challenge.

Example 24 includes features of example 23 wherein the n-bit challenge is used to generate an internal 1-hot n-bit challenge.

Example 25 includes features of example 23 wherein applying the cypher function comprises applying one of: AES S-box, Skein hash function, Whirlpool hash function S-box, El-Gamal encryption, RSA encryption, Schonorr signature, or PFP (pretty good privacy) encryption.

Example 26 illustrates an apparatus which comprises: means for receiving an n-bit challenge; means for applying a first physically unclonable function (PUF) to the n-bit challenge; means for generating first output bits in response to the application of the first PUF; means for receiving the first output bits and applying a second PUF to the first output bits; means for generating second output bits in response to the application of the second PUF; and means for applying a logic function to the second output bits to generate a response to the n-bit challenge.

Example 27 includes features of example 25 wherein the n-bit challenge is used to generate an internal 1-hot n-bit challenge.

Example 28 illustrates an apparatus which comprises: means for receiving an n-bit challenge; means for applying a first physically unclonable function (PUF) to the n-bit challenge; means for generating first output bits in response to the application of the first PUF; means for receiving the first output bits and applying a second PUF to the first output bits; means for applying a cypher function to the first output bits to generate second output bits; means for receiving second output bits and applying a second PUF to them; means for generating third output bits in response to the application of the second PUF; and means for applying a logic function to the third output bits to generate a response to the n-bit challenge.

Example 29 includes features of example 28 wherein the n-bit challenge is used to generate an internal 1-hot n-bit challenge.

Example 30 includes features of example 29 wherein the means for applying the cypher function comprises applying one of: AES S-box, Skein hash function, Whirlpool hash function S-box, El-Gamal encryption, RSA encryption, Schonorr signature, or PFP (pretty good privacy) encryption.

Example 31 is a system which comprises: a memory; a processor coupled to the memory, wherein the processor comprises an apparatus according to examples 28 through 30; a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus to provide non-linearly cascaded multi-stage machine-learning attack resistant physically unclonable function (PUF) with a unique unpredictable response to an input challenge, the apparatus comprising:
   a first stage of physically unclonable function (PUF) circuits to receive an n-bit challenge, wherein the first stage of PUF circuits comprise a first subset of n PUF cells each of which is to generate an output bit;
   a second stage of PUF circuits to receive the output bits from the first subset of n PUF cells, wherein the second stage of PUF circuits comprise a second subset of m PUF cells, wherein each PUF cell of the second subset is to generate an output bit; and
   a compare logic to compare the output bits of the second subset of m PUF cells with one another, and to generate a response bit in accordance with the comparison, wherein n is an integer, wherein m is an integer, and wherein m is less than n, wherein the compare logic comprises an exclusive-OR (XOR) gate, wherein input nodes of the XOR gate receive the output bits of the second subset of m PUF cells to compare the output bits with one another, wherein the first subset of n PUF cells is n/2 PUF cells, and wherein the second subset of m PUF cells is n/4 PUF cells.

2. The apparatus of claim 1, wherein the PUF cells of the first and second stages comprise cross-coupled inverters with multiple pull-down and pull-up legs.

3. The apparatus of claim 1, wherein the n-bit challenge is used to generate an internal 1-hot n-bit challenge.

4. An apparatus to provide non-linearly cascaded multi-stage machine-learning attack resistant physically unclonable function (PUF) with a unique unpredictable response to an input challenge, the apparatus comprising:
   a first physically unclonable function (PUF) circuit to receive a first pair of bits and a second pair of bits;
   a second PUF circuit to receive the first pair of bits and the second pair of bits;
   a third PUF circuit to receive a third pair of bits and a fourth pair of bits;
   a fourth PUF circuit to receive the third pair of bits and the fourth pair of bits; and
   a fifth PUF circuit to receive a first pair of output bits comprising a first output bit from the first PUF circuit, and a second output bit from the second PUF circuit, wherein the fifth PUF circuit is to receive a second pair of output bits comprising a first output bit from the third PUF circuit and a second output bit from the fourth PUF circuit,
   wherein the first, second, third, and fourth pair of bits are a set of challenge bits for use in a challenge-response function, and wherein the output of the XOR gate is a response output.

5. The apparatus of claim 4 comprises a sixth PUF circuit to receive the first and second pairs of output bits.

6. The apparatus of claim 5 comprises a compare logic to receive outputs from the fifth and sixth PUF circuits, and to generate an output.

7. The apparatus of claim 6, wherein the compare logic comprises an exclusive-OR gate.

8. The apparatus of claim 5, wherein at least one of the first, second, third, fourth, fifth, and sixth PUF circuits comprises cross-coupled inverters with multiple pull-down and pull-up legs.

9. A system comprising:
   a memory;
   a processor coupled to the memory, wherein the processor is to provide non-linearly cascaded multi-stage machine-learning attack resistant physically unclonable function (PUF) with a unique unpredictable response to an input challenge, wherein the processor comprises:
      a first stage of physically unclonable function (PUF) circuits to receive an n-bit challenge, wherein the first stage of PUF circuits comprise n/2 PUF cells each of which is to generate an output bit;
      a second stage of PUF circuits to receive the output bits from the n/2 PUF cells, wherein the second stage of PUF circuits comprise n/4 PUF cells each of which is to generate an output bit; and
      a compare logic to compare the output bits of the n/4 PUF cells with one another, and to generate a response bit according to the comparison, wherein 'n' is an integer, wherein the compare logic comprises an exclusive-OR (XOR) gate, and wherein input nodes of the XOR gate receive the output bits from the n/2 PUT cells to compare the output bits with one another; and
   a wireless interface to allow the processor to communicate with another device.

10. The system of claim 9, wherein the PUF cells of the first and second stages comprise cross-coupled inverters with multiple pull-down and pull-up legs.

11. The system of claim 9, wherein the n-bit challenge is a 1-hot n-bit challenge.

12. An apparatus to provide non-linearly cascaded multi-stage machine-learning attack resistant physically unclonable function (PUF) with a unique unpredictable response to an input challenge, the apparatus comprising:
   a stage of physically unclonable function (PUF) circuits to receive an n-bit challenge, wherein the stage of PUF circuits comprise a subset of n PUF cells each of which is to generate an output bit; and
   a stage of cipher blocks to receive the output bits from the subset of n PUF cells, wherein the stage of cipher blocks is to generate a plurality of bits, wherein each cipher block is to encrypt the output bits, received from the subset of n PUF cells, wherein the stage of PUF circuits is a first stage of PUF circuits, wherein the stage of cipher blocks is a first stage of cipher blocks, wherein the apparatus comprises a second stage of PUF circuits to receive the plurality of bits from the first stage of cipher blocks, and wherein the second stage of PUF circuits comprise a subset of m PUF cells each of which is to generate an output bit.

13. The apparatus of claim 12 comprises a compare logic to receive the output bits from the subset of m PUF cells of the second stage of PUF circuits, wherein the compare logic is to generate a response output for the n-bit challenge.

14. The apparatus of claim 13, wherein the compare logic comprises an exclusive-OR gate.

15. The apparatus of claim 13, wherein the n-bit challenge is used to generate an internal 1-hot n-bit challenge.

16. The apparatus of claim 12, wherein the PUF cells of the first and second stages comprise cross-coupled inverters with multiple pull-down and pull-up legs.

17. The apparatus of claim 12, wherein the stage of cipher blocks comprises one of:
AES S-box,
Skein hash function,
Whirlpool hash function S-box,
El-Gamal encryption,
RSA encryption,
Schonorr signature, or
PFP (pretty good privacy) encryption.

18. An apparatus comprising:
a first stage of physically unclonable function (PUF) cells comprising:
a first physically unclonable function (PUF) circuit to receive a first pair of bits and a second pair of bits;
a second PUF circuit to receive the first pair of bits and the second pair of bits;
a third PUF circuit to receive a third pair of bits and a fourth pair of bits; and
a fourth PUF circuit to receive the third pair of bits and the fourth pair of bits;
a second stage of PUF cells comprising:
a fifth PUF circuit to receive a first pair of output bits comprising a first output bit from the first PUF circuit, and a second output bit from the second PUF circuit, wherein the fifth PUF circuit is to receive a second pair of output bits comprising a first output bit from the third PUF circuit and a second output bit from the fourth PUF circuit; and
a sixth PUF circuit to receive the first and second pairs of output bits; and
a XOR gate to receive outputs from the fifth and sixth PUF circuits, and to generate an output,
wherein the first, second, third, and fourth pair of bits are a set of challenge bits for use in a challenge-response function, and wherein the output of the XOR gate is a response output.

19. The apparatus of claim 18, wherein at least one of the first, second, third, fourth, fifth, and sixth PUF circuits comprises cross-coupled inverters.

20. The apparatus of claim 18, wherein the cross-coupled inverters comprises multiple pull-down and pull-up legs.

* * * * *